(12) United States Patent
McLaughlin

(10) Patent No.: US 8,924,498 B2
(45) Date of Patent: Dec. 30, 2014

(54) METHOD AND SYSTEM FOR PROCESS CONTROL NETWORK MIGRATION

(75) Inventor: Paul F. McLaughlin, Ambler, PA (US)

(73) Assignee: Honeywell International Inc., Morristown, NJ (US)

( * ) Notice: Subject to any disclaimer, the term of this patent is extended or adjusted under 35 U.S.C. 154(b) by 326 days.

(21) Appl. No.: 12/942,177

(22) Filed: Nov. 9, 2010

(65) Prior Publication Data

US 2012/0117416 A1    May 10, 2012

(51) Int. Cl.
    *G06F 15/16*    (2006.01)
    *G06F 11/16*    (2006.01)
    *G06F 11/20*    (2006.01)

(52) U.S. Cl.
    CPC ........ *G06F 11/1658* (2013.01); *G06F 11/2005* (2013.01); *G06F 11/2007* (2013.01)
    USPC .......... 709/209; 714/1; 714/2; 714/3; 714/4.1; 714/5.1

(58) Field of Classification Search
    None
    See application file for complete search history.

(56) References Cited

U.S. PATENT DOCUMENTS

| | | | |
|---|---|---|---|
| 4,679,189 A | 7/1987 | Olson et al. | |
| 5,537,414 A | 7/1996 | Takiyasu et al. | |
| 5,566,356 A | 10/1996 | Taketsugu | |
| 5,664,195 A | 9/1997 | Chatterii | |
| 5,749,053 A | 5/1998 | Kusaki et al. | |
| 5,898,826 A | 4/1999 | Pierce et al. | |
| 6,141,769 A * | 10/2000 | Petivan et al. | 714/10 |
| 6,192,232 B1 | 2/2001 | Iseyama | |
| 6,256,297 B1 | 7/2001 | Haferbeck et al. | |
| 6,292,905 B1 | 9/2001 | Wallach et al. | |
| 6,374,352 B1 | 4/2002 | Goldman et al. | |
| 6,427,071 B1 | 7/2002 | Adams et al. | |
| 6,437,692 B1 | 8/2002 | Petite et al. | |
| 6,631,416 B2 | 10/2003 | Bendinelli et al. | |
| 6,694,447 B1 | 2/2004 | Leach et al. | |
| 6,701,453 B2 | 3/2004 | Chrabaszcz | |
| 6,751,219 B1 | 6/2004 | Lipp et al. | |
| 6,847,316 B1 | 1/2005 | Keller | |
| 6,850,486 B2 | 2/2005 | Saleh et al. | |
| 6,917,584 B2 | 7/2005 | Kuwabara | |

(Continued)

FOREIGN PATENT DOCUMENTS

| | | |
|---|---|---|
| DE | 4134207 C1 | 4/1993 |
| DE | 10314721 A1 | 11/2004 |

(Continued)

OTHER PUBLICATIONS

Salman Taherian, et al., "Event Dissemination in Mobile Wireless Sensor Networks", 2004 IEEE International Conference on Mobile Ad-Hoc and Sensor Systems, p. 573-575.

(Continued)

*Primary Examiner* — Dhairya A Patel
*Assistant Examiner* — Weiwei Stiltner

(57) ABSTRACT

A method includes disconnecting a first component from a first network. The first component is redundant to a second component and operates in a secondary or passive redundancy mode. The second component operates in a primary or active redundancy mode and is coupled to the first network. The method also includes updating at least one of hardware and software on the first component to allow the first component to communicate on a second network. The method further includes connecting the updated first component to the second network and synchronizing data between the updated first component on the second network and the second component on the first network. In addition, the method includes switching the updated first component from the secondary redundancy mode to the primary redundancy mode.

20 Claims, 6 Drawing Sheets

(56) References Cited

U.S. PATENT DOCUMENTS

| | | | |
|---|---|---|---|
| 6,963,781 B2 | 11/2005 | Fehrer et al. | |
| 7,031,308 B2 | 4/2006 | Garcia-Luna-Aceves et al. | |
| 7,035,937 B2 | 4/2006 | Haas et al. | |
| 7,058,848 B2 | 6/2006 | Sicola et al. | |
| 7,190,961 B2 | 3/2007 | Burr | |
| 7,203,743 B2 | 4/2007 | Shah-Heydari | |
| 7,236,987 B1 | 6/2007 | Faulkner et al. | |
| 7,240,188 B2 | 7/2007 | Takata et al. | |
| 7,275,157 B2 | 9/2007 | Winget | |
| 7,366,114 B2 | 4/2008 | Park et al. | |
| 7,440,735 B2 | 10/2008 | Karschnia et al. | |
| 7,460,865 B2 | 12/2008 | Nixon et al. | |
| 7,620,409 B2 | 11/2009 | Budampati et al. | |
| 7,688,802 B2 | 3/2010 | Gonia et al. | |
| 7,802,016 B2 | 9/2010 | Eimers-Klose et al. | |
| 2002/0072329 A1 | 6/2002 | Bandeira et al. | |
| 2002/0120671 A1 | 8/2002 | Daffner et al. | |
| 2002/0122230 A1 | 9/2002 | Izadpanah et al. | |
| 2002/0176396 A1 | 11/2002 | Hammel et al. | |
| 2003/0003912 A1 | 1/2003 | Melpignano et al. | |
| 2003/0005149 A1 | 1/2003 | Haas et al. | |
| 2003/0177150 A1 | 9/2003 | Fung et al. | |
| 2003/0212768 A1* | 11/2003 | Sullivan | 709/220 |
| 2004/0010694 A1 | 1/2004 | Collens et al. | |
| 2004/0028023 A1 | 2/2004 | Mandhyan et al. | |
| 2004/0029553 A1 | 2/2004 | Cain | |
| 2004/0083833 A1 | 5/2004 | Hitt et al. | |
| 2004/0174829 A1 | 9/2004 | Ayyagari | |
| 2004/0230899 A1 | 11/2004 | Pagnano et al. | |
| 2004/0259533 A1 | 12/2004 | Nixon et al. | |
| 2005/0059379 A1 | 3/2005 | Sovio et al. | |
| 2005/0071708 A1 | 3/2005 | Bartfai et al. | |
| 2005/0102562 A1 | 5/2005 | Shinohara et al. | |
| 2005/0141553 A1 | 6/2005 | Kim et al. | |
| 2005/0201349 A1 | 9/2005 | Budampati | |
| 2005/0228509 A1 | 10/2005 | James | |
| 2005/0254653 A1 | 11/2005 | Potashnik et al. | |
| 2005/0281215 A1 | 12/2005 | Budampati et al. | |
| 2005/0289553 A1 | 12/2005 | Miki | |
| 2006/0002368 A1 | 1/2006 | Budampati et al. | |
| 2006/0015641 A1 | 1/2006 | Ocko et al. | |
| 2006/0039347 A1 | 2/2006 | Nakamura et al. | |
| 2006/0083200 A1 | 4/2006 | Emeott et al. | |
| 2006/0104301 A1 | 5/2006 | Beyer et al. | |
| 2006/0128349 A1 | 6/2006 | Yoon | |
| 2006/0171344 A1 | 8/2006 | Subramanian et al. | |
| 2006/0171346 A1 | 8/2006 | Kolavennu et al. | |
| 2006/0227729 A1 | 10/2006 | Budampati et al. | |
| 2006/0256740 A1 | 11/2006 | Koski | |
| 2006/0271814 A1 | 11/2006 | Fung et al. | |
| 2006/0274644 A1 | 12/2006 | Budampati et al. | |
| 2006/0274671 A1 | 12/2006 | Budampati et al. | |
| 2006/0282498 A1 | 12/2006 | Muro | |
| 2006/0287001 A1 | 12/2006 | Budampati et al. | |
| 2007/0022317 A1 | 1/2007 | Chen et al. | |
| 2007/0030816 A1 | 2/2007 | Kolavennu | |
| 2007/0030832 A1 | 2/2007 | Gonia et al. | |
| 2007/0067458 A1 | 3/2007 | Chand | |
| 2007/0073861 A1 | 3/2007 | Amanuddin et al. | |
| 2007/0076638 A1 | 4/2007 | Kore et al. | |
| 2007/0077941 A1 | 4/2007 | Gonia et al. | |
| 2007/0087763 A1 | 4/2007 | Budampati et al. | |
| 2007/0091824 A1 | 4/2007 | Budampati et al. | |
| 2007/0091825 A1 | 4/2007 | Budampati et al. | |
| 2007/0103303 A1 | 5/2007 | Shoarineiad | |
| 2007/0147294 A1 | 6/2007 | Bose et al. | |
| 2007/0153677 A1 | 7/2007 | McLaughlin et al. | |
| 2007/0153789 A1 | 7/2007 | Barker, Jr. et al. | |
| 2007/0155423 A1 | 7/2007 | Carmody et al. | |
| 2007/0237137 A1 | 10/2007 | McLaughlin | |
| 2007/0261052 A1 | 11/2007 | Bale et al. | |
| 2007/0280178 A1 | 12/2007 | Hodson et al. | |
| 2008/0043637 A1 | 2/2008 | Rahman | |
| 2008/0140844 A1 | 6/2008 | Halpern | |
| 2008/0267259 A1 | 10/2008 | Budampati et al. | |
| 2008/0273547 A1 | 11/2008 | Phinney | |
| 2009/0022121 A1 | 1/2009 | Budampati et al. | |
| 2009/0034441 A1 | 2/2009 | Budampati et al. | |
| 2009/0060192 A1 | 3/2009 | Budampati et al. | |
| 2009/0086692 A1 | 4/2009 | Chen | |
| 2009/0109889 A1 | 4/2009 | Budampati et al. | |
| 2009/0138541 A1* | 5/2009 | Wing et al. | 709/201 |
| 2010/0042869 A1* | 2/2010 | Szabo et al. | 714/4 |
| 2010/0128699 A1* | 5/2010 | Yang et al. | 370/335 |
| 2010/0287548 A1* | 11/2010 | Zhou et al. | 718/1 |
| 2011/0305206 A1* | 12/2011 | Junell et al. | 370/329 |
| 2012/0101663 A1* | 4/2012 | Fervel et al. | 701/3 |

FOREIGN PATENT DOCUMENTS

| | | |
|---|---|---|
| EP | 1 081 895 A1 | 3/2001 |
| EP | 1 439 667 A2 | 7/2004 |
| GB | 2 427 329 A | 12/2006 |
| WO | WO 01/35190 A2 | 5/2001 |
| WO | WO 01/35190 A3 | 5/2001 |
| WO | WO 03/079616 A1 | 9/2003 |
| WO | WO 2004/114621 A1 | 12/2004 |
| WO | WO 2006/017994 A1 | 2/2006 |
| WO | WO 2006/053041 A1 | 5/2006 |

OTHER PUBLICATIONS

Dongyan Chen et al., "Dependability Enhancement for IEEE 802.11 Wireless LAN with Redundancy Techniques," Proceedings of the 2003 International Conference on Dependable Systems and Networks, 2003, 8 pages.

Dr. Soumitri Kolavennu, Presentation, "WNSIA MAC Layer", ISA SP100 meeting, Feb. 14, 2007, 24 pages, see esp. p. 17.

Ying Zhang, et al., "A Learning-based Adaptive Routing Tree for Wireless Sensor Networks", Journal of Communications, vol. 1, No. 2, May 2006, p. 12-21.

Yau-Ming Sun, et al., "An Efficient Deadlock-Free Tree-Based Routing Algorithm for Irregular Wormhote-Routed Networks Based on the Tu/n Model", Proceedings of the 2004 International Conference on Parattet Processing (ICPP'04), 10 pages.

Sejun Song, "Fault Recovery Port-based Fast Spanning Tree Algorithm (FRP-FAST) for the Fault-Tolerant Ethernet on the Arbitrary Switched Network Topology", 2001 IEEE, p. 325-332.

"XYR 5000 Wireless Transmitters, Honeywell Solutions for Wireless Data Acquisiton and Monitoring," wvvw.acs.honeywell.com, Feb. 2006, 6 pages.

Christopher Pulini, et al. "Gateway Supporting Transparent Redundancy in Process Control Systems and Other Systems and Related Method", U.S. Appl. No. 12/762,215, filed Apr. 16, 2010.

A. Aietto et al., -Wireless Distributed Measurement System by Using Mobile Devices, IEEE Workshop on Intelligent Data Acquisition and Advanced Computing Systems: Technology and Applications, Sep. 5-7, 2005, Sofia, Bulgaria, pp. 316-319.

International Search Report and Written Opinion of the International Searching Authority in PCT Application No. PCT/US2007/069717 dated Dec. 10, 2007.

International Search Report and Written Opinion of the International Searching Authority in PCT Application No. PCT/US2007/069614 dated Nov. 22, 2007.

International Search Report and Written Opinion of the International Searching Authority in PCT Application No. PCT/US2007/069710 dated Nov. 27, 2007.

International Search Report and Written Opinion of the International Searching Authority in PCT Application No. PCT/US2007/069705 dated Apr. 15, 2008.

Pereira, J.M. Dias, "A Fieldbus Prototype for Educational Purposes", IEEE Instrumentation & Measurement Magazine, New York, NY vol. 7, No. 1, Mar. 2004, p. 24-31.

International Search Report and Written Opinion of the International Searching Authority in PCT Application No. PCT/US2006/048334 dated Jul. 5, 2007.

European Search Report dated Oct. 6, 2008 in connection with European Patent Application No. 08 16 1387.

Ramakriona S. Budampati, et al., "Apparatus and Method for Improving the Reliability of Industrial Wireless Networks That Experience Outages in Backbone Connectivity", U.S. Appl. No. 12/869,557, filed Aug. 26, 2010.

* cited by examiner

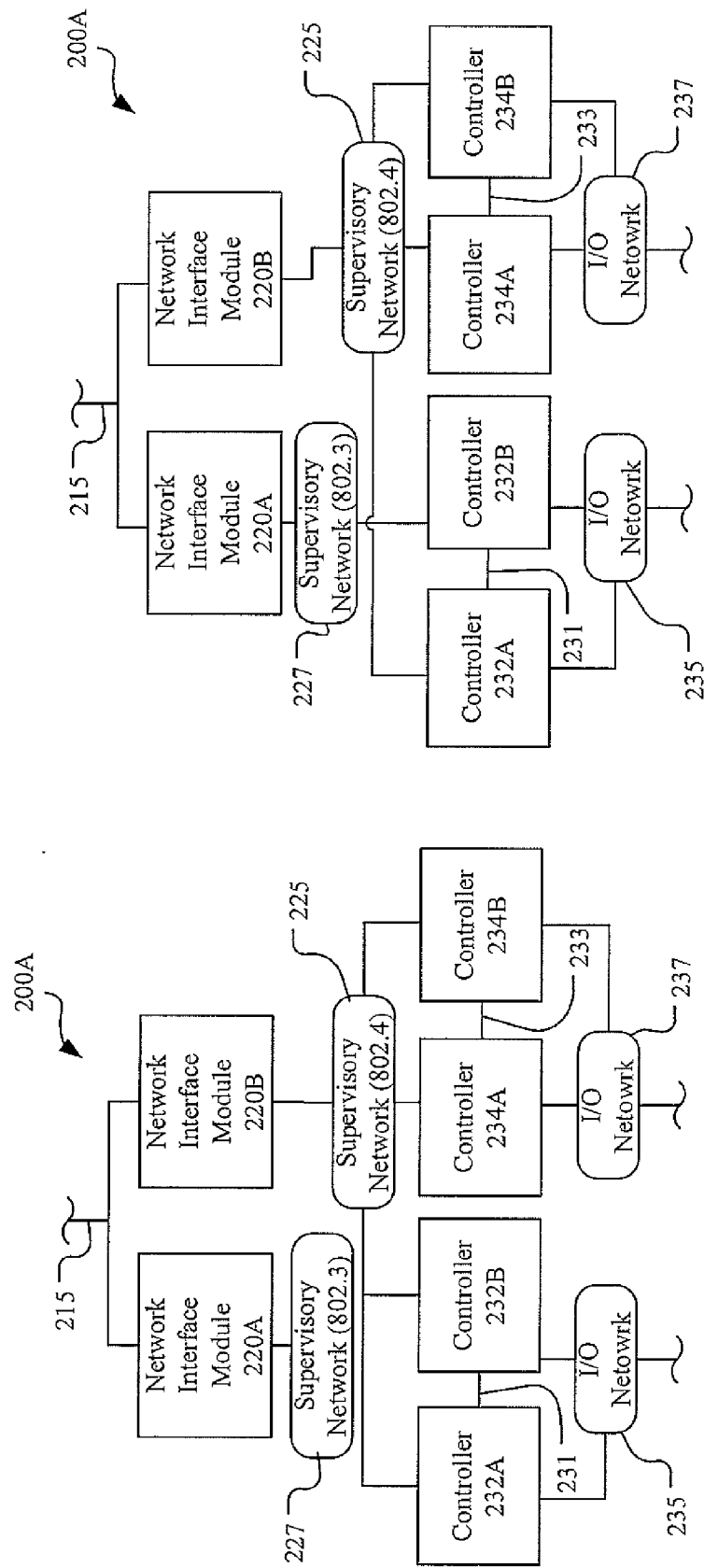

METHOD AND SYSTEM FOR PROCESS CONTROL NETWORK MIGRATION

TECHNICAL FIELD

This disclosure relates generally to control systems. More specifically, this disclosure relates to a method and system for process network migration.

BACKGROUND

Processing facilities are often managed using process control systems known as Distributed Control Systems (DCS). Example processing facilities include manufacturing plants, chemical plants, crude oil refineries, and ore processing plants. Among other operations, a DCS can manage the use of motors, valves, and other industrial equipment in the processing facilities.

In a conventional DCS, controllers are often used to control the operation of the industrial equipment in the processing facilities. The controllers could, for example, monitor the operation of the industrial equipment, provide control signals to the industrial equipment, and generate alarms when malfunctions are detected. Due to the continuous processing nature of these systems, DCS network migration from legacy technology to modern technology is often difficult or prohibitive.

SUMMARY

This disclosure provides a method and system for process control network migration.

In a first embodiment, a method includes disconnecting a first component from a first network. The first component is redundant to a second component and operates in a secondary or passive redundancy mode. The second component operates in a primary or active redundancy mode and is coupled to the first network. The method also includes updating at least one of hardware and software on the first component to allow the first component to communicate on a second network. The method further includes connecting the updated first component to the second network and synchronizing data between the updated first component on the second network and the second component on the first network. In addition, the method includes switching the updated first component from the secondary redundancy mode to the primary redundancy mode.

In a second embodiment, a system includes first and second networks, a first component coupled to the first network, and a second component coupled to the first network. The first component is redundant to the second component. The first component operates in a secondary redundancy mode while the second component operates in a primary redundancy mode. Upon disconnecting the first component from the first network, the first component is replaced with an updated first component configured to communicate on a second network. Upon connecting the updated first component to the second network, the updated first component on the second network synchronizes with the second component on the first network, and the updated first component is switched from the secondary redundancy mode to the primary redundancy mode.

In a third embodiment, a method includes disconnecting a first network interface module (NIM) node from a first network. The first NIM node is redundant to a second NIM node and operates in a secondary redundancy mode. The second NIM node operates in a primary redundancy mode and is coupled to the first network. The method also includes updating at least one of hardware and software on the first NIM node to allow the first NIM node to communicate on a second network. The method further includes connecting the updated first NIM node to the second network and placing the updated first NIM node in a primary redundancy mode, while the second NIM node is also in the primary redundancy mode. In addition, the method includes allowing an operator station to view components on the second network through the updated first NIM node and components on the first network through the second NIM node during the network migration.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 2A through 2G illustrate migrating, switching or upgrading a network in a continuous distributed control system in accordance with this disclosure.

DETAILED DESCRIPTION

Figure 1:
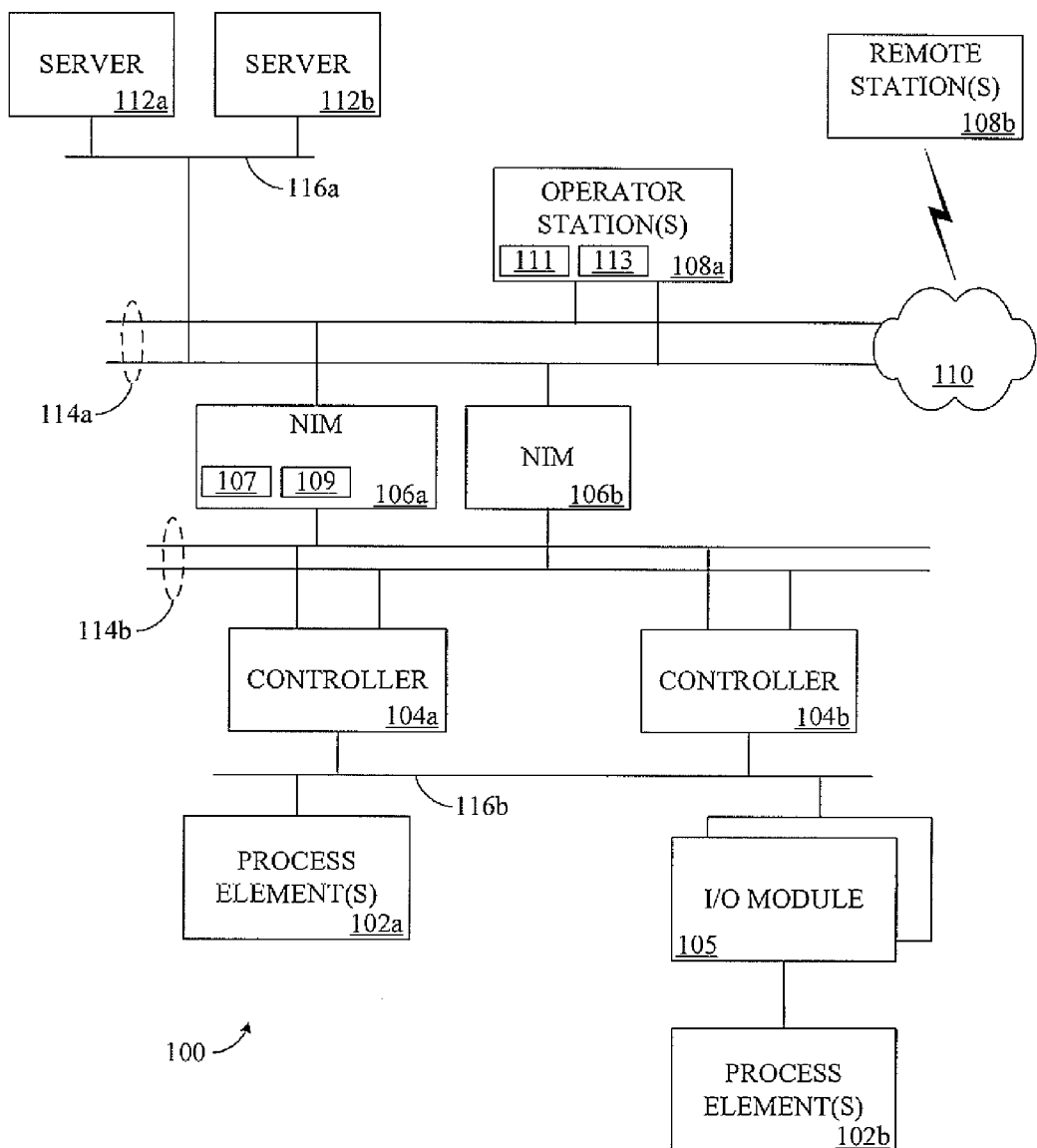
FIG. 1 illustrates an example distributed control system in accordance with this disclosure.
Figure 2A:
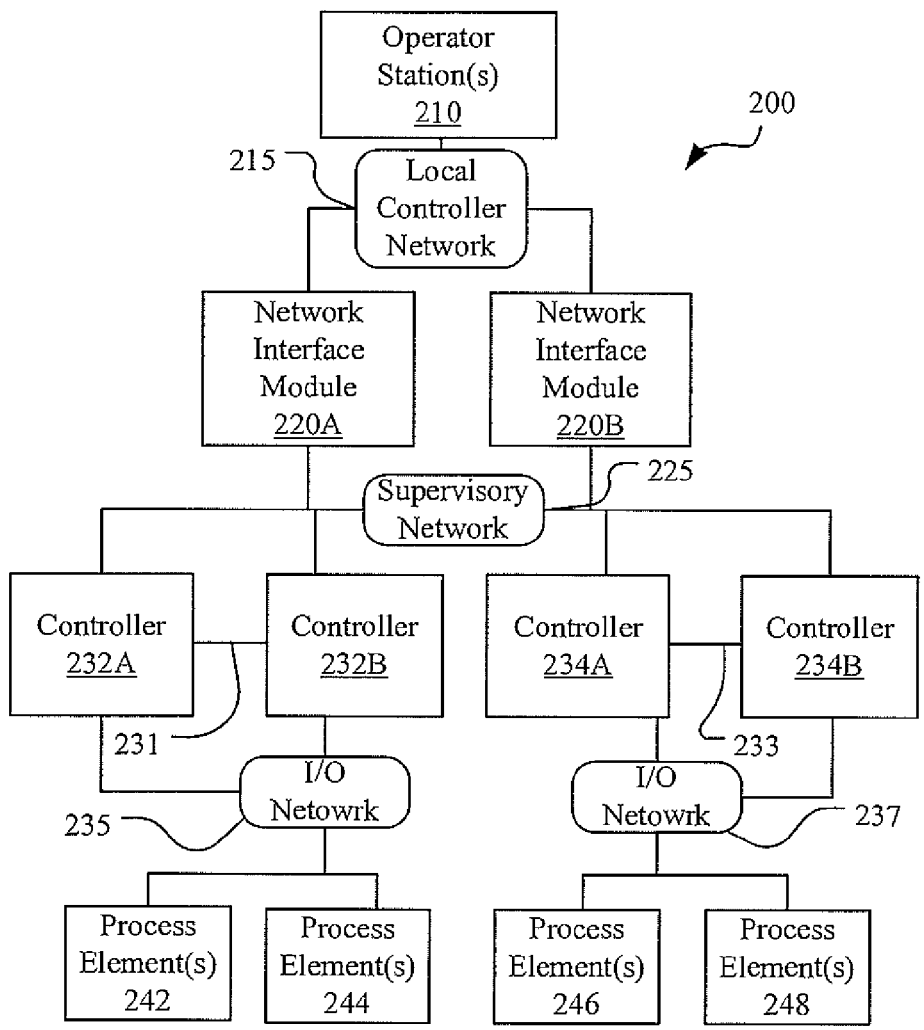
Figure 2D:
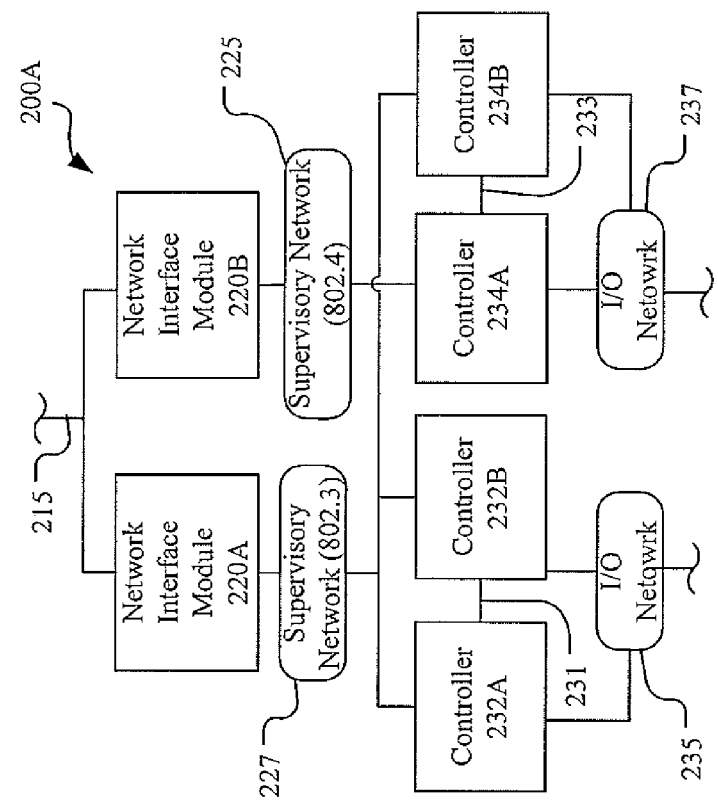
Figure 2E:
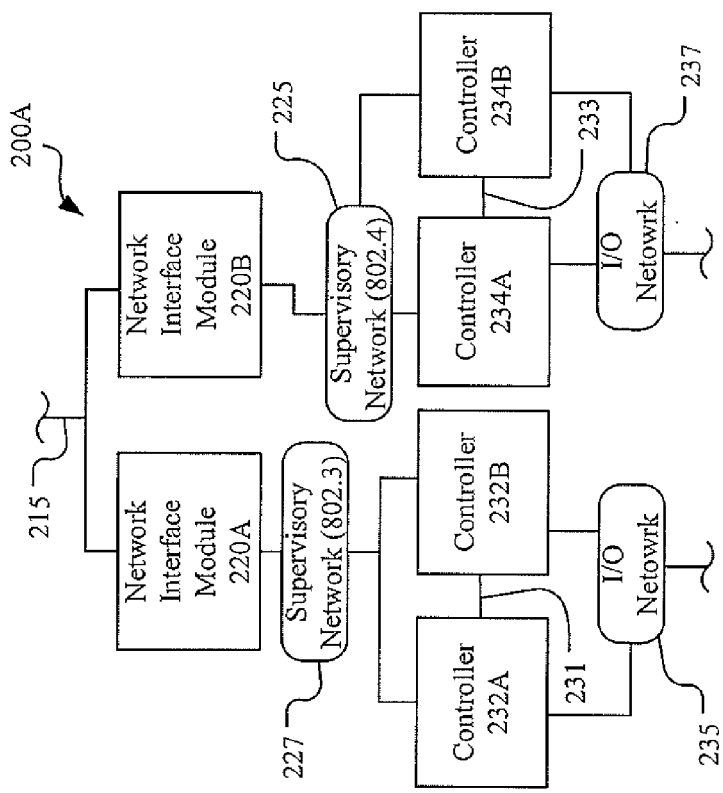
Figures 2F, 2G:
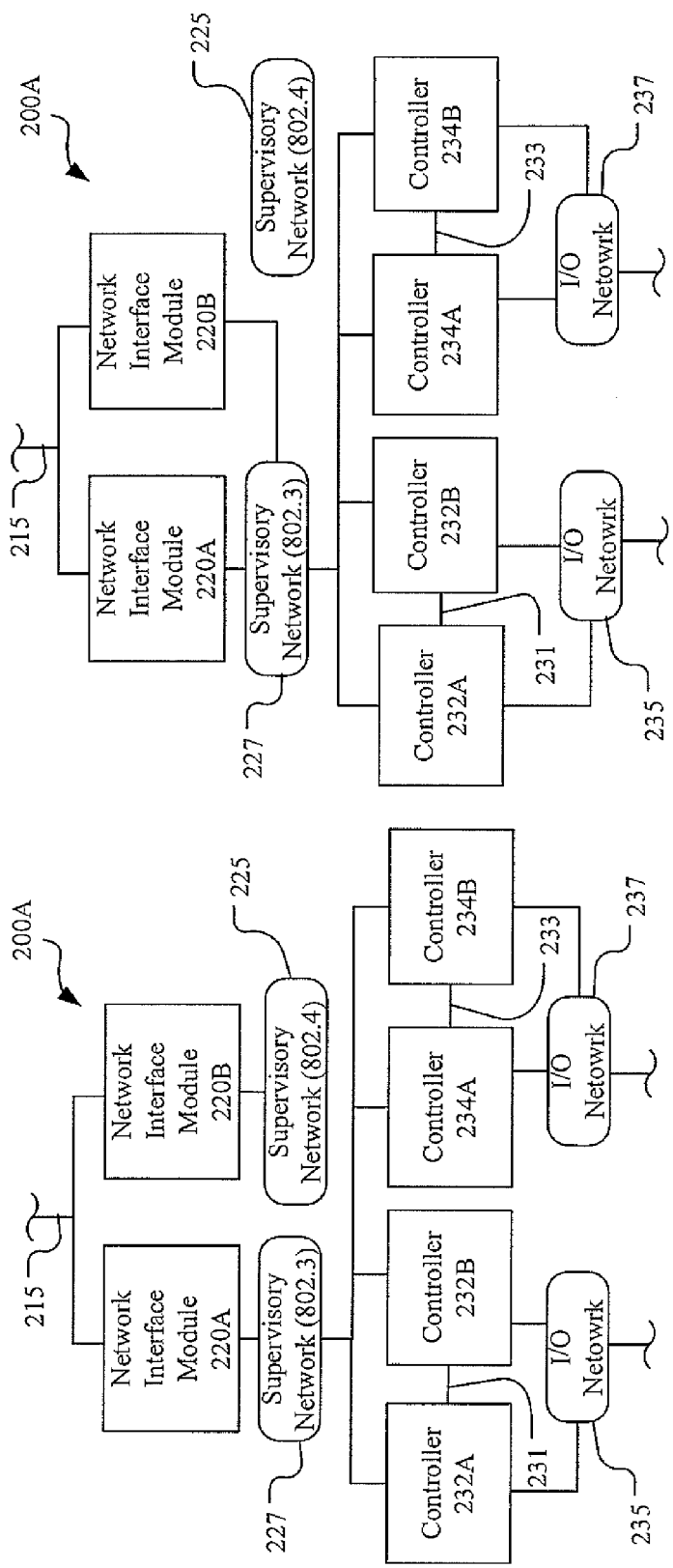
Figure 3:
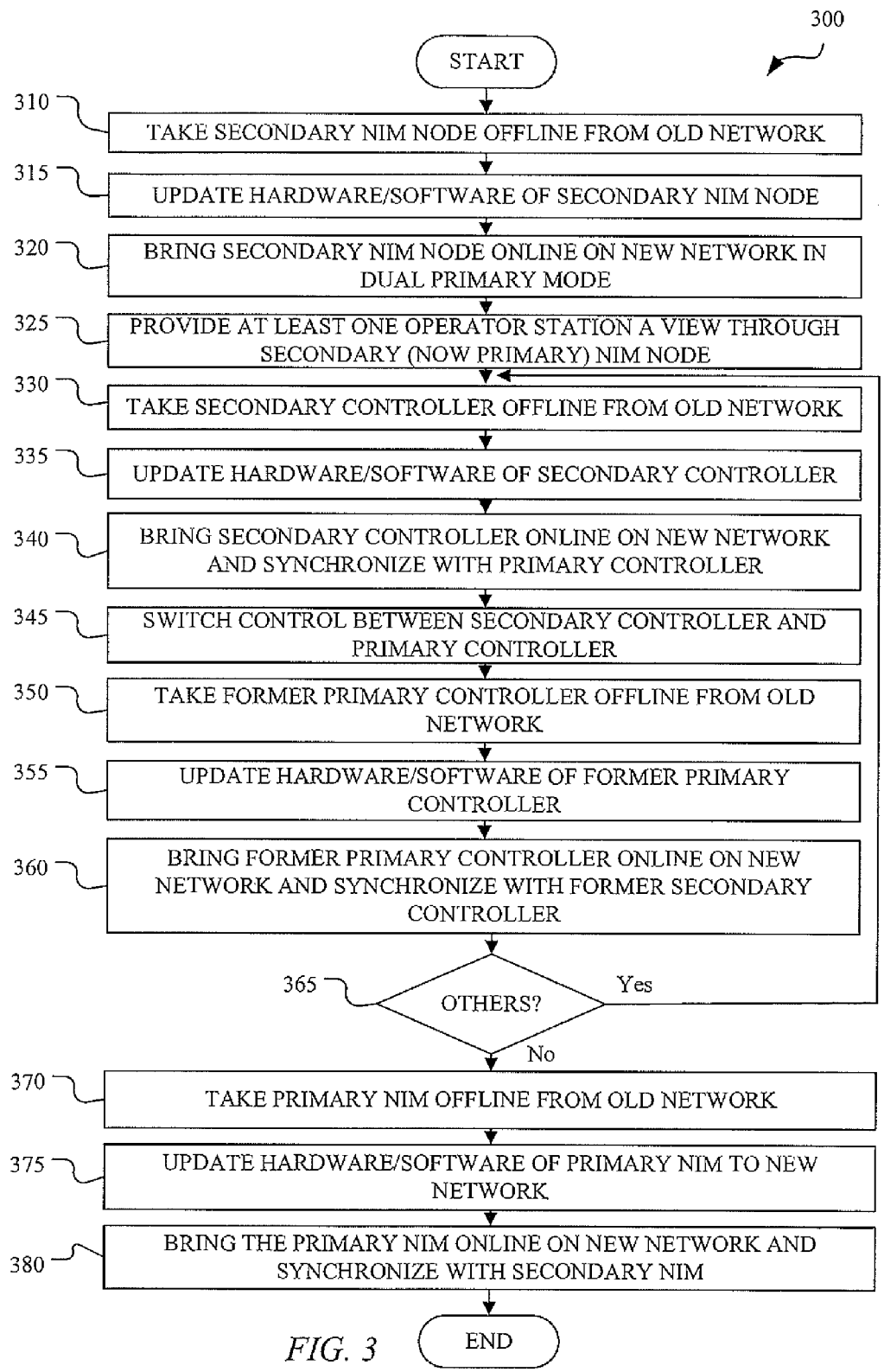
FIG. 3 illustrates an example method for migrating, switching, or upgrading a network in a continuous distributed control system in accordance with this disclosure.

FIGS. 1 through 3, discussed below, and the various embodiments used to describe the principles of the present disclosure in this patent document are by way of illustration only and should not be construed in any way to limit the scope of this disclosure. Those skilled in the art will understand that the principles of the present disclosure may be implemented in any suitably arranged system or device.

FIG. 1 illustrates an example distributed control system 100 in accordance with this disclosure. The distributed control system 100 shown in FIG. 1 is for illustration only. Other embodiments of a distributed control system may be used without departing from the scope of this disclosure.

As shown in FIG. 1, the distributed control system 100 includes one or more process elements 102a-102b. The process elements 102a-102b represent components in a process or production system that may perform any of a wide variety of functions. For example, the process elements 102a-102b could represent gauges, valves, transmitters, sensors, motors, catalytic crackers, valves, or other industrial equipment in a production or processing environment. The process elements 102a-102b could represent any other or additional components in any suitable process or production system. The process elements 102a-102b may be referred to as "field devices." Each of the process elements 102a-102b includes any suitable structure for performing one or more functions in a process or production system. Although two process elements 102a-102b are shown in FIG. 1, any number of process elements could be used in the distributed control system 100.

Two controllers 104a-104b are coupled to the process elements 102a-102b. The controllers 104a-104b control the operation of the process elements 102a-102b. For example, the controllers 104a-104b could be capable of generating control signals for some of the process elements 102a-102b based on data received from others of the process elements 102a-102b. Each of the controllers 104a-104b includes any suitable structure for controlling one or more process elements. Example controllers 104a-104b could include, but are not limited to, C300 controllers and SERIES C Fieldbus Interface Modules (FIMs) from HONEYWELL INTERNATIONAL INC.

In some embodiments, one or more input/output (I/O) modules 105 could operate between the controllers 104a-104b and one or more of the process elements 102a-102b (one or more process elements 102b in this case). Each I/O module 105 facilitates communication between the controllers 104a-104b and the process element(s) 102b. For example, an I/O module 105 could represent a data acquisition device that receives data from a controller and provides the data to a process element. The I/O module 105 could also receive data from the process element and provide the data to the controller. Each I/O module 105 includes any suitable structure for facilitating communication between controllers and process elements. Example I/O modules could include, but are not limited to, SERIES C IOM from HONEYWELL INTERNATIONAL INC. As shown in FIG. 1, the I/O modules 105 could operate in redundant groups.

Two network interface modules (NIMs) 106a-106b are coupled to the controllers 104a-104b. The NIMs 106a-106b perform various functions to support the operation and control of the controllers 104a-104b and the process elements 102a-102b. For example, the NIMs 106a-106b could log information collected or generated by the controllers 104a-104b, such as status information related to the operation of the process elements 102a-102b. The NIMs 106a-106b could also execute applications that control the operation of the controllers 104a-104b, thereby controlling the operation of the process elements 102a-102b. In addition, the NIMs 106a-106b could provide secure access to the controllers 104a-104b. Each of the NIMs 106a-106b includes any suitable structure for providing access to or control of the controllers 104a-104b. Each of the NIMs 106a-106b could, for example, include one or more processors 107 and one or more memories 109 storing data and instructions used by the processor(s) 107 (such as software executed by the NIMs 106a-106b). In particular embodiments, the NIMs 106a-106b could represent personal computers (such as desktop computers) executing a MICROSOFT WINDOWS operating system.

One or more operator stations 108a-108b are coupled to the NIMs 106a-106b. The operator stations 108a-108b represent computing or communication devices providing user access to NIMs 106a-106b, controllers 104a-104b, process elements 102a-102b, or other devices. As particular examples, the operator stations 108a-108b could allow users to review the operational history of the process elements 102a-102b using information collected by the controllers 104a-104b and/or the NIMs 106a-106b. The operator stations 108a-108b could also allow the users to adjust the operation of the process elements 102a-102b, controllers 104a-104b, or NIMs 106a-106b. Each of the operator stations 108a-108b includes any suitable structure for supporting user access and control of the system 100. Each of the operator stations 108a-108b could, for example, include one or more processors 111 and one or more memories 113 storing data and instructions used by the processor(s) 111 (such as software executed by the operator stations 108a-108b). In particular embodiments, the operator stations 108a-108b could represent personal computers executing a MICROSOFT WINDOWS operating system.

In particular embodiments, at least one of the operator stations 108b is remote and communicates through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any suitable structure for controlling the overall operation of the system 100.

As shown in FIG. 1, the system 100 may include various redundant networks 114a-114b and single networks 116a-116b that support communication between components in the system 100. Each of these networks 114a-114b, 116a-116b may represent any suitable network or combination of networks facilitating communication between components in the system 100. As particular examples, network 114a could represent a pair of Ethernet networks or a FAULT TOLERANT ETHERNET network from HONEYWELL INTERNATIONAL INC., and each of the networks 116a-116b could represent an Ethernet network.

In one aspect of operation, the controllers 104a-104b can execute logic, such as in the form of software or firmware instructions. Also, the controllers 104a-104b may operate as redundant controllers in the distributed control system 100. For example, the controller 104a could function as a primary controller, which means the controller 104a functions as the primary or main controller of the process elements 102a-102b. The controller 104b could function as a backup or secondary controller, which means the controller 104b could be synchronized with the controller 104a and take over control of the process elements 102a-102b when necessary (such as after a failure of the controller 104a).

In certain scenarios, it may be desirable to switch all or portions of the distributed control system 100 over to a new or different communication network. One problem with a network switchover is that components of the distributed control system 100 and the distributed control system 100, itself, typically operate in a continuous manner. Accordingly, the network cannot be taken offline during the switchover. Given these problems, this disclosure provides a manner for switching a network of a distributed control system 100 during continuous operation of the distributed control system 100.

Although FIG. 1 illustrates one example of a distributed control system 100, various changes may be made to FIG. 1. For example, the functional division in FIG. 1 is for illustration only. Various components in FIG. 1 could be omitted, combined, or further subdivided and additional components could be added according to particular needs. Also, FIG. 1 illustrates one example operational environment in which the network migration functionality described below can be used. This functionality could be used in any other suitable system.

FIGS. 2A through 2G illustrate migrating, switching or upgrading a network in a continuous distributed control system in accordance with this disclosure. Although specific components and specific networks are discussed below, this disclosure is not limited to these specific components and networks. Other components and networks may be used without departing from the scope of this disclosure.

FIG. 2A shows a portion of a distributed control system 200 in accordance with this disclosure. The distributed control system 200 may be viewed as an alternative view of components in the distributed control system 100 of FIG. 1. The distributed control system 200 is shown with operator station(s) 210; network interface module (NIM) nodes 220A-220B; controllers 232A-232B and 234A-234B; and process elements 242-248.

The operator station(s) 210 can communicate with the NIM nodes 220a-220b through at least a local controller network 215. In particular embodiments, the local controller network 215 may be associated with a TDC3000 system from HONEYWELL INTERNATIONAL INC. However, the local controller network 215 may be associated with other types of systems or networks. The NIM nodes 220A-220B are in communication with the controllers 232A-232B and 234A-234B at least through a supervisory network 225. In particular embodiments, the supervisory network 225 may utilize a Manufacturing Automation Protocol (MAP), standardized as IEEE 802.4. However, the supervisory network 225 may utilize other protocols. As described below, the supervisory network 225 is switched over to a new or different supervisory network 227.

The controllers 232A-232B and 234A-234B are in communication with the process elements 242-248 at least through input/output (I/O) networks 235, 237. The controller pair 232A, 232B communicates with the process elements 242, 244 through I/O network 235 whereas the controller pair 234A, 234B communicates with the process elements 246, 248 through I/O network 237. The I/O networks 235, 237 may support any suitable protocol (proprietary or open) for facilitating communication between the controller 232A-232B, 234A-234B and the process elements 242-248.

The operator station(s) 210 may generally correspond to the operator stations 108a-108b of FIG. 1 or any other operator stations. The NIM nodes 220A-220B may generally correspond to any component that serves as a bridge for communications to or from the operator station(s) 210 and the supervisory network 225. In some embodiments, the NIM nodes 220A-220B may correspond to NIMs 106a-106b of FIG. 1. The controllers 232A-232B and 234A-234B may generally correspond to the controllers 104a-104b of FIG. 1 or any other controllers.

In FIG. 2A, the controllers 232A-232B form a first redundant pair, and the controllers 234A-234B form a second redundant pair. Controllers 232A-232B have a private path 231 of communication and controllers 234A-234B have a private path 233 of communication. In each redundant pair, one of the controllers operates as a primary controller (in a primary or active redundant mode), while the other controller operates as a secondary or backup controller (in a secondary or passive redundant mode). Although only two redundant pairs of controllers are shown, one pair or more than two pairs may be utilized in operation. Also, although redundant controllers are described as a "pair," other redundant configurations may involve more than two controllers. Additionally, a secondary controller may be redundant for more than one primary controller.

For discussion purposes, the controllers 232A and 234A are described as the primary controllers, while the controllers 232B and 234B are described as the secondary controllers. The interaction between the primary controllers 232A, 234A and the secondary controllers 232B, 234B may occur in any of a variety of manners. The following is one non-limiting example of such interaction. Assuming that a primary controller 232A, 234A is running and a redundant secondary controller 232B, 234B is just coming online, the primary controller 232A, 234A may automatically "see" or be in communication with the secondary controller 232B, 234B and vice versa. This may occur, for example, through the privates paths 231, 233; supervisory network 225; and/or the I/O networks 235, 237.

When the primary controller 232A, 234A sees the secondary controller 232B, 234B, synchronization between the two may occur. For example, the primary controller 232A, 234A may begin sending appropriate process information to the secondary controller 232B, 234B. The process information may include state information for the process elements 242-248 or other information that the secondary controller 232B, 234B may need in the event that the secondary controller 232B, 234B needs to become the primary controller.

When the secondary controller 232B, 234B initially comes online, the primary controller 232A, 234A may send an initial load file to the secondary controller 232B, 234B, for example, using the private paths 231, 233. Then, the primary controller 232A, 234A may send changes or deltas to the initial load at what is referred to as an "atomic" level, for example, using the private paths 231, 233. That is, all changes for a particular delta or change period may be sent as a single atomic record. In particular embodiments, the changes may be sent over the private paths 231, 233 every ⅛th of a second, although changes may be sent at a lower or higher frequency.

Although a particular synchronization operation has been described, other synchronization processes may be utilized without departing from the scope of this disclosure. For example, data could be sent between controllers in any other suitable manner. Additionally, synchronization may occur between controllers using communication paths other than the private paths 231, 233.

During operation, the secondary controller 232B, 234B may step in and become the primary controller 232A, 234A in the event that the primary controller fails. The detection of the failure may occur at either the primary controller 232A, 234A or the secondary controller 232B, 234B.

The NIM nodes 220A-220B may operate as a redundant pair in much the same manner described above with reference to the controllers, except that a redundant NIM pair may only undergo an initial synchronization when one or the other initially comes online. This synchronization may occur using the supervisory network 225 or local controller network 215. As described in more detail below, the NIM nodes 220A-220B may operate in a dual primary mode (as opposed to primary/secondary redundant mode) during a network switchover.

FIG. 2B shows a portion 200A of the distributed control system 200. In FIG. 2B, a new supervisory network 227 has been introduced. For purposes of illustration, the previous supervisory network 225 is shown as an IEEE 802.4-based protocol (MAP), while the new supervisory network 227 is shown as an IEEE 802.3-based protocol (Ethernet). Although the use of these two protocols are described, a network transition may occur between any other networks, such as from a copper network to an optical network or between protocols on the same network. As one example, one may switch from a ControlNet-based network to an IEEE 802.3-based network. Additionally, although a switchover is described with reference to a supervisory network, other networks may be switched over without departing from the scope of this disclosure. For example, although network migration for a NIM/controller configuration is described below, other networks may avail from teaching of this disclosure. For example, teachings of the disclosure may also be applied to a network migration for a server/controller configuration.

The NIM node 220A may be operating as a redundant secondary node to the NIM node 220B. Prior to connecting the NIM node 220A to the new supervisory network 227, the NIM node 220A may be taken offline, and the hardware or software on the NIM node 220A may be modified, changed, or replaced in order to allow the NIM node 220A to communicate over the new supervisory network 227. In particular embodiments, instead of modifying hardware or software, a new NIM node may be installed.

Upon bringing the NIM node 220A online with the supervisory network 227, the NIM nodes 220A and 220B are placed in "dual primary" mode, as opposed to primary and secondary modes. In a dual primary mode, an operator may have two paths through which to view networked components, such as the controllers 232A-232B and 234A-234B and the process elements 242-248. As shown in FIG. 2B, an operator can only view components through NIM node 220B because there are no components connected downstream from the NIM node 220A. As components are brought online to the new supervisory network 227 as described below, an operator may view such components through the NIM node 220A.

FIG. 2C illustrates the secondary controller 232B being disconnected from the old supervisory network 225 and connected to the new supervisory network 227. Initially, the secondary controller 232B is operating in a redundant secondary node to the primary controller 232A. Upon being disconnected from the supervisory network 225, hardware and/or software on the controller 232B may be modified, changed, or replaced to allow the controller 232B to communicate on the new supervisory network 227. Alternatively, a new controller may be utilized in certain embodiments. Upon bringing the controller 232B back online and connecting the controller 232B to the supervisory network 227, the controller 232B begins to synchronize with the primary controller 232A in the same manner described above with reference to FIG. 2A or using any other synchronization technique. For example, an initial load file may be sent from the primary controller 232A to the secondary controller 232B followed by atomic change files. The controllers 232A-232B no longer see each through the supervisory network 225. However, the controllers 232A-232B can see each other through the private paths 231 and the I/O network 235 and may utilize any one or more of such paths for synchronization.

After synchronization between the controllers 232A-232B, the secondary controller 232B may be switched to a primary redundancy mode. For example, a swap command may be issued to the secondary controller 232B, which is then relayed to the primary controller 232A to inform both controllers of the desired switchover. This is unlike typical failover scenarios because both controllers 232A-232B are healthy and see no reason for a switchover. In other embodiments, the switchover may occur in any of a variety of other manners, such as when the primary controller 232A is turned off to force the failover to the secondary controller 232B.

In particular embodiments, after the switchover, the controller 232A may be left on the old supervisory network 225 for a time period. This ensures that the controller 232B is operating correctly on the new supervisory network 227. If an actual or perceived error occurs, the controller 232A could resume operation as the primary controller on the old supervisory network 225.

With reference to FIG. 2D, the controller 232A (now secondary) has been added to the new supervisory network 227. Similar to that described with controller 232B, hardware and/or software on the controller 232A may be may be modified, changed, or replaced to allow the controller 232A to communicate on the new supervisory network 227. Alternatively, a new controller may be utilized. Upon bringing the controller 232A online and connecting the controller 232A to the supervisory network 227, the controller 232A begins to synchronize with the primary controller 232B in the same manner described above with reference to FIG. 2A or in some other manner. At this point, both controllers 232A-232B are now viewable through the supervisory network 227.

With reference to FIGS. 2E and 2F, the process described above with reference to FIGS. 2D and 2E is repeated except with another redundant pair, namely controllers 234A-234B. In FIG. 2E, the controller 234B is upgraded and switched from the supervisory network 225 to the supervisory network 227. In FIG. 2F, the controller 234A is upgraded and switched from the supervisory network 225 to the supervisory network 227.

With reference to FIG. 2G, once the controllers 232A-232B and 234A-234B have been switched over to the new supervisory network 227, a view is no longer needed through the NIM node 220B. Accordingly, the NIM node 220B can be taken out of dual primary mode and placed in a secondary mode to the NIM node 220A. Upon being placed in the secondary redundancy mode, the NIM node 220B synchronizes with the NIM node 220A in a manner similar to that described with reference to FIG. 2A.

Although FIGS. 2A through 2G illustrate migrating, switching or upgrading a network in a continuous distributed control system, various changes may be made to FIGS. 2A through 2G. For example, networks in any other system could be migrated, switched, or upgraded.

FIG. 3 illustrates an example method 300 for migrating, switching, or upgrading a network in a continuous process system in accordance with this disclosure. At step 310, for a redundant pair of NIM nodes, a secondary NIM node is taken offline from an old network. A primary NIM node may still be online and connected to the old network. At step 315, hardware and/or software of the secondary NIM node is updated for communication on a new network. In other embodiments, the secondary NIM node may be replaced. At step 320, the secondary NIM node is brought online on the new network. Upon being brought online, the secondary NIM node may be placed in a dual primary mode with the primary NIM node on the old network. At step 325, an operator station is provided a view through the secondary (now primary) NIM node to the new network. As described above, this may be a second path to view components, as the operator may also be able to view components on the old network through the original primary NIM node.

At step 330, for a redundant pair of controllers, a secondary controller is taken offline from the old network. A primary controller may still be online on the old network. At step 335, the hardware and/or software of the secondary controller is updated for communication on the new network. In some embodiments, the secondary controller may be replaced. At step 340, the secondary controller is brought online on the new network. Upon being brought online, the secondary controller may begin to synchronize with the primary controller on the old network. This synchronization may occur in the manner described above or in any other suitable manner. At step 345, a switch in control may occur between the secondary controller and the primary controller. This may occur in a variety of different manners. As one example, an operator may issue a swap command to the secondary controller. The secondary controller may in turn send the swap command to the primary controller. With this swap command, control is transferred from the primary controller to the secondary controller.

At step 350, the former primary controller may be taken offline from the old network. At step 355, the hardware and/or software of the former primary controller is updated for communication on the new network. In other embodiments, the former primary controller may be replaced. At step 360, the former primary controller is brought online on the new network. Upon being brought online, the former primary controller may begin to synchronize with the former secondary controller on the new network. This synchronization may occur in the manner described above or in any other suitable manner.

At decisional step 365, a determination may be made as to whether additional controller pairs need to be updated for the new network. If so, the method returns to step 330 to transfer another redundant pair. If not, the method 300 may proceed to step 370. At step 370, the primary NIM node is taken offline from the old network. At step 375, the hardware and/or software of the primary NIM node is updated for communication on the new network. In other embodiments, the primary NIM node may be replaced. At step 380, the primary NIM node is brought online on the new network. Upon being brought online, the primary NIM node may begin to synchronize with the secondary (now co-primary) NIM node on the new network. This synchronization may occur in the manner described above or in any other suitable manner. Following synchronization, one of the NIM nodes may be moved from the primary redundant mode to the secondary redundant mode.

Although FIG. 3 illustrates an example method 300 for migrating, switching, or upgrading a network in a continuous process system, various modifications may be made. For example, while shown as a series of steps, various steps in FIG. 3 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

physically disconnecting a first component from a first network, the first component redundant to a second component, the first component operating in a secondary redundancy mode, the second component operating in a primary redundancy mode, the second component coupled to the first network;

updating at least one of hardware and software on the first component to allow the first component to communicate on a second network, the second network utilizing a different protocol than the first network;

physically connecting the updated first component to the second network;

synchronizing data between the updated first component on the second network and the second component on the first network;

switching the updated first component from the secondary redundancy mode to the primary redundancy mode; and switching the second component on the first network from the primary redundancy mode to the secondary redundancy mode;

wherein:

the first and second components comprise controllers in a continuous distributed control system;

control commands are continuously sent from or through at least one of the controllers to a process element in the continuous distributed control system during the disconnecting, updating, connecting, and synchronizing;

the second component on the first network is configured to switch back to the primary redundancy mode;

communications to or from the process element are sent through the second network when the updated first component is in the primary redundancy mode; and communications to or from the process element are sent through the first network when the second component is in the primary redundancy mode.

2. The method of claim 1, further comprising:

disconnecting the second component from the first network;

updating at least one of hardware and software on the second component to allow the second component to communicate on the second network;

connecting the updated second component to the second network; and synchronizing data between the updated first component on the second network and the updated second component on the second network.

3. The method of claim 1, wherein:

the first network is an IEEE 802.4-based network or a ControlNet-based network; and the second network is an IEEE 802.3-based network.

4. A method comprising:
physically disconnecting a first component from a first network, the first component redundant to a second component, the first component operating in a secondary redundancy mode, the second component operating in a primary redundancy mode, the second component coupled to the first network;
updating at least one of hardware and software on the first component to allow the first component to communicate on a second network, the second network utilizing a different protocol than the first network;
physically connecting the the updating first component to the second network;
synchronizing data between the updated first component on the second network and the second component on the first network;
switching the updated first component from the secondary redundancy mode to the primary redundancy mode;
disconnecting a first network interface module (NIM) node or a first server from the first network, the first NIM node or the first server redundant to a second NIM node or a second server, the first NIM node or the first server operating in the secondary redundancy mode, the second NIM node or the second server operating in the primary redundancy mode, the second NIM node or the second server coupled to the first network;
updating at least one of hardware and software on the first NIM node or the first server to allow the first NIM node or the first server to communicate on the second network;
connecting the updated first NIM node or the updated first server to the second network;
placing the updated first NIM node or the updated first server in the primary redundancy mode while the second NIM node or the second server is also in the primary redundancy mode; and
allowing an operator station to view network components on the second network through the updated first NIM node or the updated first server and network components on the first network through the second NIM node or the second server.

5. The method of claim 4, further comprising:
disconnecting the second NIM node or the second server from the first network;
updating at least one of hardware and software on the second NIM node or the second server to allow the second NIM node or the second server to communicate on the second network;
connecting the updated second NIM node or the updated second server to the second network;
synchronizing data between the updated first NIM node or the updated first server and the updated second NIM node or the updated second server; and
switching at least one of the updated NIM nodes or the updated servers from the primary redundancy mode to the secondary redundancy mode.

6. The method of claim 5, wherein disconnecting the second NIM node or the second server from the first network occurs after all network components on the first network viewable through the second NIM node or the second server have been moved to the second network.

7. A method comprising:
physically disconnecting a first component from a first network, the first component redundant to a second component, the first component operating in a secondary redundancy mode, the second component operating in a primary redundancy mode, the second component coupled to the first network;
replacing the first component with an updated first component, the updated first component configured to communicate on a second network, the second network utilizing a different protocol than the first network;
physically connecting the updated first component to the second network;
synchronizing data between the updated first component on the second network and the second component on the first network;
switching the updated first component from the secondary redundancy mode to the primary redundancy mode; and
switching the second component on the first network from the primary redundancy mode to the secondary redundancy mode;
wherein:
the first and second components comprise controllers in a continuous distributed control system;
control commands are continuously sent from or through at least one of the controllers to a process element in the continuous distributed control system during the disconnecting, updating connecting, and synchronizing;
the second component on the first network is configured to switch back to the primary redundancy mode;
communications to or from the process element are sent through the second network when the updated first component is in the primary mode; and
communications to or from the process element are sent through the first network when the second component is in the primary redundancy mode.

8. The method of claim 7, further comprising:
disconnecting the second component from the first network;
replacing the second component with an updated second component, the updated second component configured to communicate on the second network;
connecting the updated second component to the second network; and
synchronizing data between the updated first component on the second network and the updated second component on the second network.

9. The method of claim 7, wherein:
the first network is an IEEE 802.4-based network or a ControlNet-based network; and
the second network is an IEEE 802.3-based network.

10. A method comprising:
physically disconnecting a first component from a first network, the first component redundant to a second component, the first component operating in a secondary redundancy mode, the second component operating in a primary redundancy mode, the second component coupled to the first network;
replacing the first component with an updated first component, the updated first component configured to communicate on a second network, the second network utilizing a different protocol than the first network;
physically connecting the updated first component to the second network;
synchronizing data between the updated first component on the second network and the second component on the first network;
switching the updated first component from the secondary redundancy mode to the primary redundancy mode;
disconnecting a first network interface module (NIM) node or a first server from the first network, the first NIM node or the first server redundant to a second NIM node or a second server, the first NIM node or the first server operating in the secondary redundancy mode, the second NIM node or the second server operating in the primary redundancy mode, the second NIM node or the second server coupled to the first network;

replacing the first NIM node or the first server with an updated first NIM node or updated first server, the updated first NIM node or updated first server configured to communicate on the second network;

connecting the updated first NIM node or the updated first server to the second network;

placing the updated first NIM node or the updated first server in the primary redundancy mode while the second NIM node or the second server is also in the primary redundancy mode; and allowing an operator station to view network components on the second network through the updated first NIM node or the updated first server and network components on the first network through the second NIM node or the second server.

11. The method of claim 10, further comprising:
disconnecting the second NIM node or the second server from the first network;
replacing the second NIM node or the second server with an updated second NIM node or an updated second server, the updated second NIM node or the updated second server configured to communicate on the second network;
connecting the updated second NIM node or the updated second server to the second network;
synchronizing data between the updated first NIM node or the updated first server and the updated second NIM node or the updated second server; and
switching at least one of the updated NIM nodes or the updated servers from the primary redundancy mode to the secondary redundancy mode.

12. The method of claim 11, wherein disconnecting the second NIM node or the second server from the first network occurs after all network components on the first network viewable through the second NIM node or the second server have been moved to the second network.

13. The method of claim 1, further comprising:
placing redundant network interface module (NIM) nodes or redundant servers in a dual primary mode; wherein:
the NIM nodes or servers are in communication with both the first and second components on the first network while in a redundancy mode; and
the NIM nodes or servers simultaneously provide a path of communication to the first component through the second network and to the second component through the first network while in the dual primary mode.

14. A method comprising:
physically disconnecting a first component from a first network, the first component redundant to a second component, the first component operating in a secondary redundancy mode, the second component operating in a primary redundancy mode, the second component coupled to the first network;
updating at least one of hardware and software on the first component to allow the first component to communicate on a second network, the second network utilizing a different protocol than the first network;
physically connectintg updated first component to the second network;
synchronizing data between the updated first component on the second network and the second component on the first network;
switching the updated first component from the secondary redundancy mode to the primary redundancy mode;
placing redundant network interface module (NIM) nodes or redundant servers in a dual primary mode, wherein:
the NIM nodes or servers are in communication with both the first and second components on the first network while in a redundancy mode; and
the NIM nodes or servers simultaneously provide a path of communication to the first component through the second network and to the second component through the first network while in the dual primary mode; and
leaving the second component on the first network for a period of time during the simultaneously provided path from the NIM nodes or servers to determine whether an error occurs with the first component on the second network.

15. A method comprising:
physically disconnecting a first component from a first network, the first component redundant to a second component, the first component operating in a secondary redundancy mode, the second component operating in a primary redundancy mode, the second component coupled to the first network;
updating at least one of hardware and software on the first component to allow the first component to communicate on a second network, the second network utilizing a different protocol than the first network;
physically connecting the updated first component to the second network;
synchronizing data between the updated first component on the second network and the second component on the first network;
switching the updated first component from the secondary redundancy mode to the primary redundancy mode; and
placing redundant network interface module (NIM) nodes or redundant servers in a dual primary mode, wherein:
the NIM nodes or servers are in communication with both the first and second components on the first network while in a redundancy mode; and
the NIM nodes or servers simultaneously provide a path of communication to the first component through the second network and to the second component through the first network while in the dual primary mode; and
wherein the synchronizing occurs through a communication path other than the second network and the first network.

16. The method of claim 1, wherein the synchronizing occurs through a communication path other than the second network and the first network.

17. The method of claim 4, wherein the synchronizing occurs through a communication path other than the second network and the first network.

18. The method of claim 7, wherein the synchronizing occurs through a communication path other than the second network and the first network.

19. The method of claim 10, wherein the synchronizing occurs through a communication path other than the second network and the first network.

20. The method of claim 14, wherein the synchronizing occurs through a communication path other than the second network and the first network.

* * * * *